(Model.)

W. T. VALLANDINGHAM.
COMBINED HAY RAKE AND LOADER.

No. 246,354.

2 Sheets—Sheet 1.

Patented Aug. 30, 1881.

WITNESSES
Fred. G. Dieterich
Geo. Brinkenburg

INVENTOR
Wm. T. Vallandingham
by A. Snoad & Co.
Attorneys (Model.)
2 Sheets—Sheet 2.
W. T. VALLANDINGHAM.
COMBINED HAY RAKE AND LOADER.
No. 246,354.                     Patented Aug. 30, 1881.
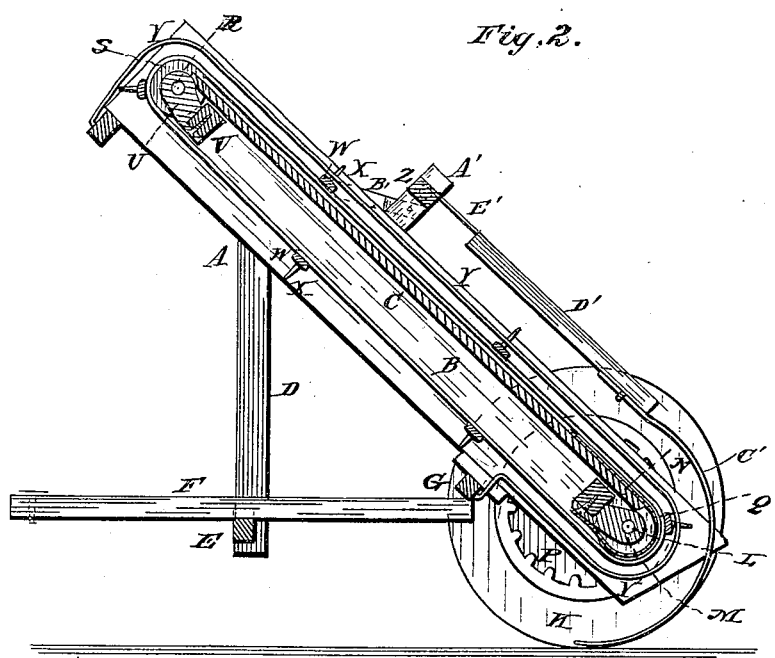
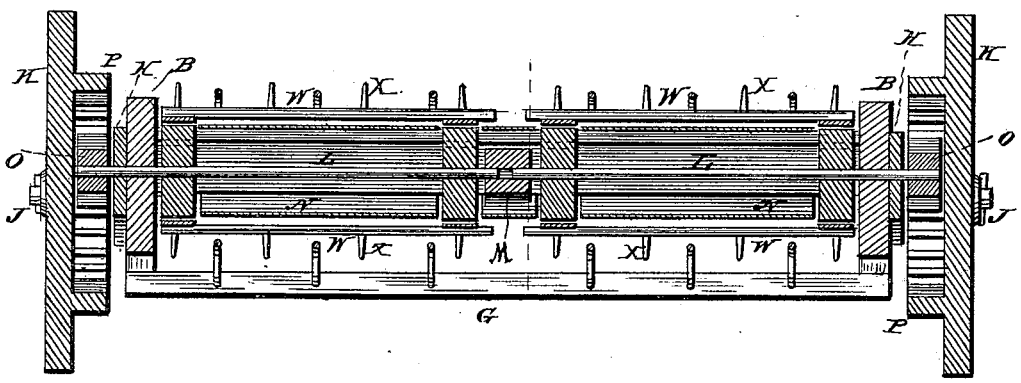
WITNESSES
INVENTOR

UNITED STATES PATENT OFFICE.

WILLIAM T. VALLANDINGHAM, OF MAUCH CHUNK, IOWA, ASSIGNOR OF ONE-HALF TO JAMES VALLANDINGHAM, OF SAME PLACE.

COMBINED HAY RAKE AND LOADER.

SPECIFICATION forming part of Letters Patent No. 246,354, dated August 30, 1881.

Application filed June 23, 1881. (Model.)

*To all whom it may concern:*

Be it known that I, WILLIAM T. VALLANDINGHAM, of Mauch Chunk, in the county of Mahaska and State of Iowa, have invented certain new and useful Improvements in Combined Hay Rakes and Loaders; and I do hereby declare that the following is a full, clear, and exact description of the invention, which will enable others skilled in the art to which it appertains to make and use the same, reference being had to the accompanying drawings, which form a part of this specification.

Figure 1:
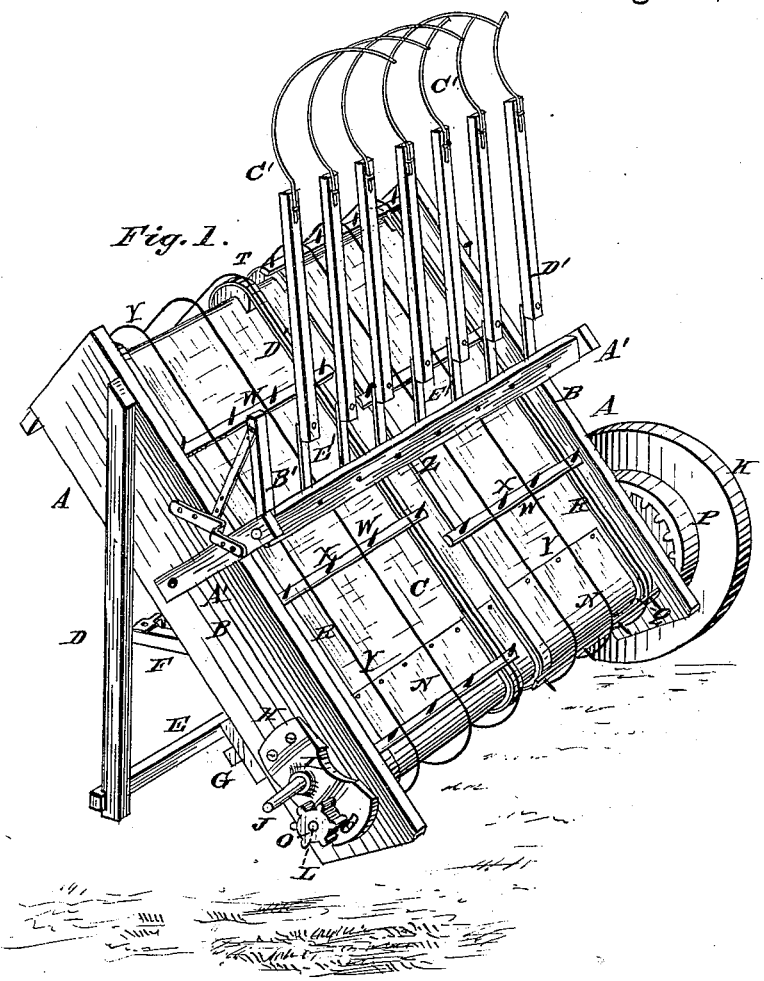
Figure 4:
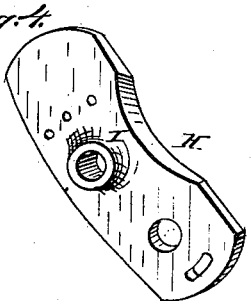

Figure 1 is a perspective view of my improved combined hay rake and loader. Fig. 2 is a vertical longitudinal sectional view. Fig. 3 is a vertical cross-section, taken through the wheels and main shaft; and Fig. 4 is a detail view, showing the adjustable casting which forms a bearing for the main shaft and carries the stub-axles.

Corresponding parts in the several figures are denoted by like letters of reference.

This invention relates to combined hay rakes and loaders; and it consists in certain improvements in the construction of the same, which will be hereinafter fully described, and particularly pointed out in the claims.

In the drawings hereto annexed, A represents the frame of my improved machine, which consists of two side pieces, B B, connected by a floor, C. The sides B are provided near the front end of the frame with downward-projecting beams or brackets D, connected by a cross-piece, E, to which a longitudinal tongue, F, is secured, as shown, the rear end of said tongue being also secured to a cross-beam, G, secured under the frame near the rear end of the latter.

To the outer sides of the frame-beams, near the rear end, are secured castings H, supporting the ends I of the axle J, upon which the transporting-wheels K are journaled. Said castings also form boxes or bearings for the outer ends of the shafts L L, the inner ends of which are journaled in a bracket, M, projecting rearward from the axle. The shafts are covered with metallic guard-plates N.

Upon their outer ends the shafts L are provided with pinions O, engaging cog-wheels P, formed or secured upon the inner sides of the transporting-wheels, from which motion is thus communicated to said shafts. The shafts L are provided with pulleys Q for the belts R of the carriers or elevators, the upper ends of which work upon pulleys S T, journaled, respectively, to the sides of the frame and to a bracket, U, projecting forwardly from a cross-piece, V, connecting the frame-sides. The belts R, of which it will be seen there are four, are connected in pairs by slats W, having teeth or prongs X. Curved guard-wires Y are secured to the upper and lower ends of the frame between the teeth X, to prevent clogging.

Z is the rake-head, which is journaled between uprights A' A', projecting upward from the sides of the frame, and which is provided with a lever, B', by which it may be operated. The rake-teeth C', which are made of wire, are secured to wooden rods D', which are connected to the rake-head by flat springs E'. By this construction perfect elasticity and freedom of operation are secured.

In operation the machine is attached by its tongue to the rear axle of an ordinary wagon. The rake gathers the hay and the carriers elevate it and deposit it in the wagon, as is usual in this class of machines.

Having thus described my invention, I claim and desire to secure by Letters Patent of the United States—

1. The combination of the rake-head Z with the teeth C', secured to wooden rods connected to the head by flat springs E', as herein described, for the purpose set forth.

2. The combination, with the elevating belts or aprons of the carriers R R, encompassing shafts L, and pulleys S T, supported in brackets U M, connected to the frame, the latter supporting the axle and the former the upper rollers, of the rake-head Z, having the teeth C', connected to it by the bars D', and flat springs E', substantially as and for the purpose specified.

In testimony that I claim the foregoing as my own I have hereto affixed my signature in presence of two witnesses.

WILLIAM THOMAS VALLANDINGHAM.

Witnesses:
G. M. VALLANDINGHAM,
R. G. OKEY.